(12) United States Patent
Schoor

(10) Patent No.: US 9,778,350 B2
(45) Date of Patent: Oct. 3, 2017

(54) ANGULARLY RESOLVING RADAR SENSOR

(71) Applicant: Robert Bosch GmbH, Stuttgart (DE)

(72) Inventor: Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 548 days.

(21) Appl. No.: 14/312,099

(22) Filed: Jun. 23, 2014

(65) Prior Publication Data

US 2015/0048970 A1   Feb. 19, 2015

(30) Foreign Application Priority Data

Jun. 25, 2013 (DE) ...................... 10 2013 2012 079

(51) Int. Cl.
| | |
|---|---|
| *G01S 13/32* | (2006.01) |
| *G01S 13/48* | (2006.01) |
| *H01Q 1/32* | (2006.01) |
| *H01Q 3/26* | (2006.01) |
| *H01Q 21/22* | (2006.01) |
| *G01S 7/35* | (2006.01) |
| *G01S 13/46* | (2006.01) |
| *G01S 3/46* | (2006.01) |

(52) U.S. Cl.
CPC ............... *G01S 13/48* (2013.01); *G01S 7/35* (2013.01); *G01S 13/32* (2013.01); *G01S 13/46* (2013.01); *H01Q 1/3233* (2013.01); *H01Q 3/2605* (2013.01); *H01Q 21/22* (2013.01); *G01S 3/46* (2013.01)

(58) Field of Classification Search
CPC . G01S 13/48; G01S 13/46; G01S 7/35; G01S 13/32; H01Q 1/3233; H01Q 3/2605; H01Q 21/22
USPC ........................................................ 342/149
See application file for complete search history.

(56) References Cited

U.S. PATENT DOCUMENTS

| | | | | |
|---|---|---|---|---|
| 4,283,729 | A * | 8/1981 | Richardson ............ | H01Q 25/00 342/380 |
| 8,466,829 | B1 * | 6/2013 | Volman ..................... | G01S 3/48 342/133 |
| 2005/0046607 | A1 * | 3/2005 | Volman .................. | G01S 13/282 342/109 |
| 2005/0225481 | A1 * | 10/2005 | Bonthron ................ | G01S 7/032 342/175 |

(Continued)

*Primary Examiner* — Peter Bythrow
(74) *Attorney, Agent, or Firm* — Norton Rose Fulbright US LLP; Gerard Messina

(57) ABSTRACT

An angularly resolving radar sensor having multiple antenna elements that, in a direction in which the radar sensor is angularly resolving, are disposed in different positions, and having a control and evaluation device that is designed for an operating mode in which several of the antenna elements transmit signals that are respectively received by several of the antenna elements, and the angle (θ) of a located object is identified on the basis of amplitudes and/or phase relationships between signals which correspond to different configurations of transmitting and receiving antenna elements, wherein the control and evaluation device is embodied to supply several of the transmitting antenna elements simultaneously with identical-frequency signals ($f_1$-$f_4$) in such a way that the common phase center of said signals is located between the positions of two adjacent antenna elements.

10 Claims, 3 Drawing Sheets

(56) References Cited

U.S. PATENT DOCUMENTS

| | | | | |
|---|---|---|---|---|
| 2006/0007041 A1* | 1/2006 | Oomuro | ............. | H01Q 1/246 342/368 |
| 2006/0152403 A1* | 7/2006 | Wicks | ............. | G01S 13/9035 342/25 R |
| 2007/0075889 A1* | 4/2007 | Sheen | ............. | G01S 13/89 342/22 |
| 2010/0231436 A1* | 9/2010 | Focke | ............. | G01S 13/931 342/70 |
| 2010/0328157 A1* | 12/2010 | Culkin | ............. | H01Q 21/061 342/372 |
| 2012/0169525 A1* | 7/2012 | Klar | ............. | G01S 7/4004 342/70 |
| 2014/0266868 A1* | 9/2014 | Schuman | ............. | G01S 13/9029 342/25 B |

* cited by examiner

ANGULARLY RESOLVING RADAR SENSOR

FIELD OF THE INVENTION

The present invention relates to an angularly resolving radar sensor, in particular for motor vehicles, having multiple antenna elements that, in a direction in which the radar sensor is angularly resolving, are disposed in different positions, and having a control and evaluation device that is designed for an operating mode in which several of the antenna elements transmit signals that are respectively received by several of the antenna elements, and the angle of a located object is identified on the basis of amplitude relationships and/or phase relationships between signals which correspond to different configurations of transmitting and receiving antenna elements.

BACKGROUND INFORMATION

Radar sensors are used in motor vehicles, for example, in order to measure the distances, relative velocities, and azimuth angles of vehicles or other objects located in the area in front of the own vehicle. The individual antenna elements are then disposed, for example, at a distance from one another on a horizontal line, so that different azimuth angles of the located objects result in differences in the path lengths that the radar signals must travel from the object to the respective antenna element. These path length differences result in corresponding differences in the phase of the signals that are received by the antenna elements and evaluated in the associated evaluation channels. By equalizing the (complex) amplitudes received in the different channels with corresponding amplitudes in an antenna diagram, the angle of incidence of the radar signal, and thus the azimuth angle of the located object, can be identified.

To allow a high angular resolution to be achieved, the aperture of the antenna should be as large as possible. If the distances between the adjacent antenna elements are too large, however, ambiguities can occur in the angle measurement, since the same phase relationships between the received signals are obtained for path length differences that differ by an integral multiple of the wavelength λ. An unambiguous angle measurement can be achieved, for example, with a uniform linear array (ULA) structure in which the antenna elements are disposed at distances of λ/2. In this case, however, with increasing aperture there is also an increase in the number of antenna elements and thus also in the number of evaluation channels, so that correspondingly high hardware costs ensue.

In a multiple input/multiple output (MIMO) radar, a greater angular resolution capability is achieved by working not only with several receiving antenna elements but also with several transmitting antenna elements, different combinations of transmitting and receiving antenna elements being evaluated, for example, on a time-multiplexed or optionally also frequency-multiplexed or code-multiplexed basis. The varying positions of the transmitting antenna elements then result in additional phase differences and thus in signals that are equivalent to signals that would be obtained with a configuration having a single transmitting antenna element and additional (virtual) receiving antenna elements. The aperture is thereby virtually enlarged, and the angular resolution thus improved.

In the interest of maximum angular resolution, it is advantageous if the virtual antenna array is thinned out in such a way that the individual antenna elements are at relatively large distances from one another. In these circumstances, however, the unambiguity condition is no longer met, so that especially with noisy radar echoes, ambiguities and thus "jumpy" angle measurements occur, i.e. abrupt changes in the measured azimuth angle occasionally occur when a radar target is tracked over a longer period of time.

SUMMARY

An object of the invention is to create a MIMO radar that, with a high angular resolution capability, permits an angle measurement with improved unambiguity.

This object is achieved in that the control and evaluation device is embodied to supply several of the transmitting antenna elements simultaneously with identical-frequency signals in such a way that the common phase center of said signals is located between the positions of two adjacent antenna elements.

When two antenna elements are supplied with identical-frequency signals, the radar waves emitted by those two antenna elements become superimposed into one signal having a modified phase position. This signal is equivalent to a signal that would be emitted from a point located between the two antenna elements. This point constitutes the phase center of the two signals. Because, according to the present invention, this phase center is located at a site at which a real antenna element is not located, the result of exciting two or more antenna elements together is to produce additional (virtual) transmitting antenna elements that can be combined with the real receiving antenna elements and thus cause the virtual antenna array to be filled out. The configuration thus comes closer to a ULA structure, and the probability of ambiguities decreases.

Interconnecting two or more antenna elements furthermore has the advantage that a higher transmitted power is achieved, and the range of the radar sensor is thus improved.

In an advantageous embodiment the real antenna elements are disposed at irregular distances so that the antenna configuration exhibits as few symmetries as possible, contributing to a further suppression of ambiguities. In addition, it is thereby possible to prevent virtual antenna positions, which result from combinations of different transmitting and receiving elements, from coinciding in terms of location.

In an advantageous embodiment the radar sensor is embodied as a monostatic radar sensor, i.e. each antenna element can be used as both a transmitting element and a receiving element.

When two or more antenna elements are supplied with an identical-frequency signal, the phases and amplitudes at which the signal is delivered to the two or more elements do not necessarily need to match. According to a refinement of the invention, this creates the possibility of beam shaping.

DETAILED DESCRIPTION

Figure 1:
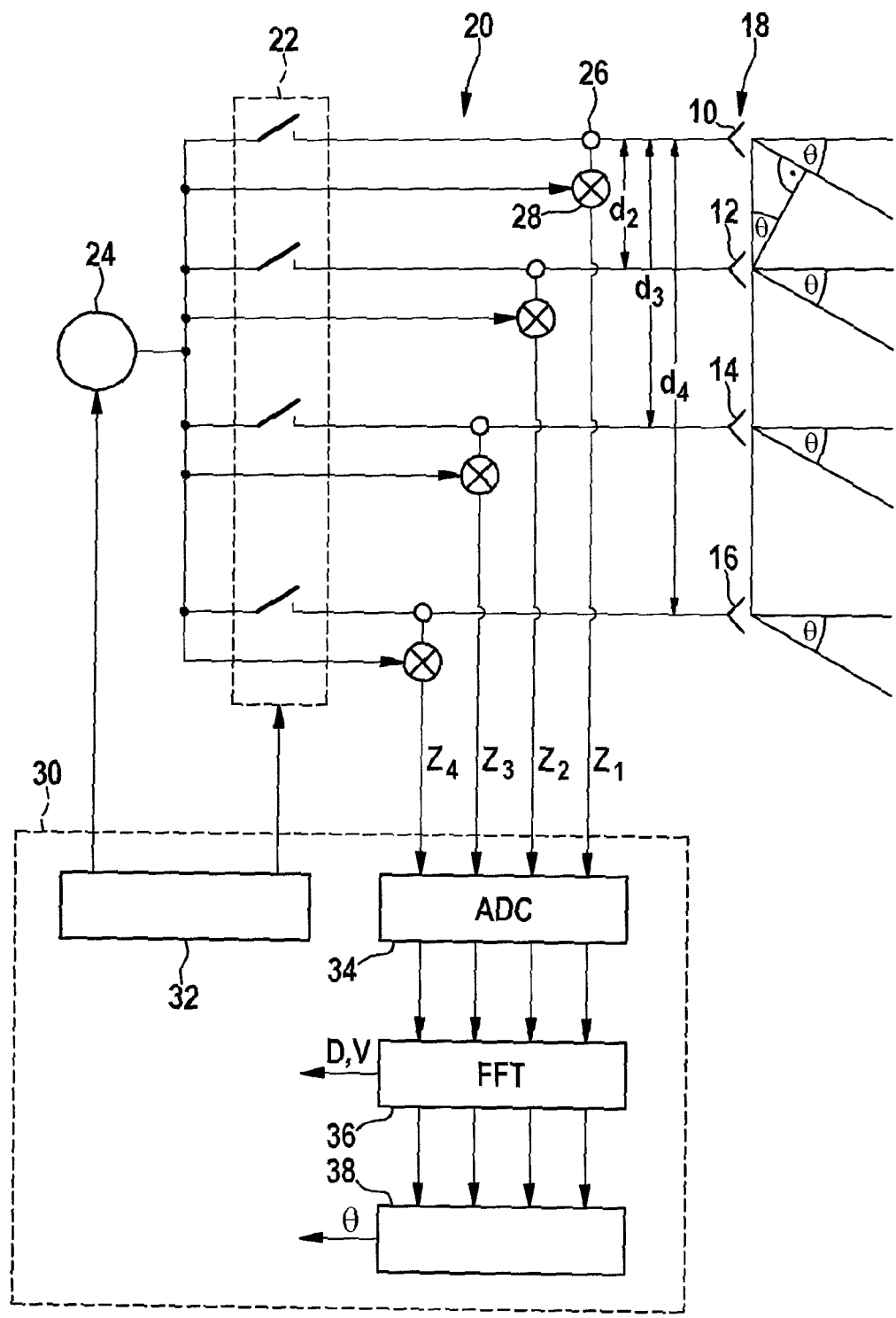
FIG. 1 is a block diagram of a radar sensor according to the present invention.

The radar sensor shown in FIG. 1 has four antenna elements 10, 12, 14, 16 that together form a planar group antenna 18. The radar sensor is incorporated into a motor vehicle in such a way that antenna elements 10 to 16 are located next to one another at the same height, so that an angular resolution capability of the radar sensor in the horizontal (in azimuth) is achieved. FIG. 1 symbolically depicts radar beams that are received by the antenna elements at an azimuth angle θ.

A high-frequency section 20 for applying control to the antenna elements is constituted, for example, by a monolithic microwave integrated circuit (MMIC), and encompasses a switching network 22 with which the individual antenna elements are selectively connectable to a local oscillator 24 that generates the radar signal to be transmitted. The radar echoes received by antenna elements 10 to 16 are respectively coupled out with the aid of a circulator 26 and delivered to a mixer 28, where they are mixed with the transmitted signal furnished by oscillator 24. An intermediate-frequency signal $Z_1$, $Z_2$, $Z_3$, $Z_4$ is thereby obtained for each of the antenna elements, and is delivered to an electronic control and evaluation unit 30.

Control and evaluation unit 30 contains a control section 32 that controls the functioning of oscillator 24 and of switching network 22. In the example shown, the radar sensor is a frequency modulated continuous wave (FMCW) radar, i.e. the frequency of the transmitted signal furnished by oscillator 24 is periodically modulated in the form of a sequence of rising and/or falling frequency ramps.

Control and evaluation unit 30 furthermore contains an evaluation section having a four-channel analog/digital converter 34 that digitizes the intermediate-frequency signals $Z_1$ to $Z_4$ obtained from the four antenna elements and records each one over the duration of a single frequency ramp. The time signals thus obtained are then converted channel by channel in a transformation section 36, by fast Fourier transformation, into corresponding frequency spectra. In these frequency spectra, each located object is visible in the form of a peak whose frequency position is dependent on the signal propagation time from the radar sensor to the object and back to the radar sensor and, because of the Doppler effect, on the relative velocity of the object. From the frequency positions of two peaks that were obtained for the same object but on frequency ramps having different slopes, e.g. a rising ramp and a falling ramp, the distance D and relative velocity V of the relevant object can then be calculated in known fashion.

In another embodiment, the radar sensor can also operate using the chirp sequence modulation method, in which the transmitted signal is made up of a sequence of identical frequency-modulated signal pulses (chirps). The modulation pattern is then made up not of an individual modulation ramp but of a complete set of successive chirps. This is a pulse Doppler method with pulse compression, in which firstly a separation of the radar objects according to their distances is accomplished and then, based on the differences in phase positions between the reflections of the individual signal pulses, changes in location and thus velocities of the radar objects are ascertained. In a typical modulation pattern the center frequencies of the individual chirps regularly increase or decrease from one chirp to the next, so that the chirps in turn form a ramp that is referred to as a "slow ramp," while the chirps are also referred to as "fast ramps." This method is also referred to as "multi-speed" FMCW (MSFMCW).

As depicted schematically in FIG. 1 with reference to the radar beams, the result of the different positions of antenna elements 10 to 16 is that the radar beams that have been emitted from one and the same antenna element, reflected at the object, and then received by the various antenna elements travel along different path lengths and therefore exhibit phase differences that depend on the azimuth angle θ. The associated intermediate-frequency signals $Z_1$ to $Z_4$ also exhibit corresponding phase differences. The amplitudes (magnitudes) of the received signals are also different from one antenna element to another, again as a function of the azimuth angle θ. The dependence of the complex amplitudes, i.e. absolute magnitudes and phases, of the received signals on the azimuth angle θ can be stored for each antenna element in control and evaluation unit 30 in the form of an antenna diagram. For each located object (each peak in the frequency spectrum) an angle estimator 38 compares the complex amplitudes obtained in the four receiving channels with the antenna diagrams in order thereby to estimate the azimuth angle θ of the object. The value at which the measured amplitudes correlate best with the values read out from the antenna diagrams is assumed to be most probable value for the azimuth angle.

In the case of the MIMO radar described here, however, the complex amplitudes in the four channels also depend on which of the four antenna elements 10, 12, 14, 16 is being used as a transmitting element. For example, switching network 22 makes it possible to transmit a first frequency ramp or sequence of frequency ramps with antenna element 10, then to switch over to antenna element 12 and then successively to antenna elements 14 and 16, after which a new cycle begins. The result is that 4×4=16 different constellations, which can be described by the signal model below, are obtained.

For the planar linear antenna array having antenna elements 10, 12, 14, 16 as a receiving array, the control vector $a_{r\mu}(\theta)$ has (on the assumption that the antenna elements are ideally isotropic) the following components:

$$a_{r\mu}(\theta)=\exp(2\pi i \cdot (d_{r\mu}/\lambda)\cdot\sin(\theta)), \mu=1,\ldots,4.$$

This control vector determines the phase relationships between the complex amplitudes of the signals that are received by the four antenna elements. The index μ here designates the antenna element, and the variables $d_{r\mu}$ indicate the positions of the antenna elements in the horizontal, with reference to any arbitrarily selected origin.

For the transmitting array, the control vector $a_{tv}(\theta)$ correspondingly has the following components:

$$a_{tv}(\theta)=\exp(2\pi i \cdot (d_{tv}/\lambda)\cdot\sin(\theta)), v=1,\ldots,4.$$

In the example shown in FIG. 1 of a monostatic array having four antenna elements, the location of antenna element 10 can be taken as a coordinate origin, so that:

$$d_{r1}=d_{t1}0,$$

$$d_{r2}=d_{t2}=d_2,$$

$$d_{r3}=d_{t3}=d_3, \text{ and}$$

$$d_{r4}=d_{t4}=d_4.$$

For angle estimation, according to the MIMO principle the virtual array vector is then constituted by calculating the Kronecker product of $a_{tv}(\theta)$ and $a_{r\mu}(\theta)$:

$$a(\theta)=(a_{t1}(\theta)\cdot a_{r1}(\theta), a_{t1}(\theta)\cdot a_{r2}(\theta), a_{t1}(\theta)\cdot a_{r3}(\theta),$$
$$a_{t1}(\theta)\cdot a_{r4}(\theta), a_{t2}(\theta)\cdot a_{r1}(\theta), a_{t2}(\theta)\cdot a_{r2}(\theta), a_{t2}(\theta)\cdot a_{r3}(\theta), a_{t2}(\theta)\cdot a_{r4}(\theta), a_{t3}(\theta)\cdot a_{r1}(\theta), a_{t3}(\theta)\cdot a_{r2}(\theta),$$
$$a_{t3}(\theta)\cdot a_{r3}(\theta), a_{t3}(\theta)\cdot a_{r4}(\theta), a_{t4}(\theta)\cdot a_{r1}(\theta), a_{t4}(\theta)\cdot a_{r2}(\theta), a_{t4}(\theta)\cdot a_{r3}(\theta), a_{t4}(\theta)\cdot a_{r4}(\theta))$$

The product vector has 16 components, corresponding to 16 positions of virtual antenna elements. The components of the vector have the form:

$$a_{tv}(\theta)\cdot a_{r\mu}(\theta)=\exp(2\pi i \cdot ((d_{tv}+d_{r\mu})/\lambda)\cdot\sin(\theta)),$$
$$v=1,\ldots,4, \mu=1\ldots,4$$

The virtual antenna positions thus correspond to the sums that can be calculated from the variables $d_1$ to $d_4$. The virtual array thus extends horizontally over a substantially larger span, i.e. it has a larger aperture and thus results in a higher angular resolution, since even small changes in the azimuth angle θ result in larger phase differences.

If, however, in order to obtain the largest possible aperture, the values $d_1$ to $d_4$ are selected to be appreciably larger than λ/2, the periodicity of the factor sin(θ) then makes possible the occurrence in the components of the array vector, in isolated cases, of azimuth angles at which the antenna diagrams for all the virtual antenna elements exhibit similar complex amplitudes, so that the actual azimuth angle of the object cannot be unambiguously determined According to the present invention the virtual array is therefore filled out with additional virtual elements. For this purpose, in certain operating phases switching network 22 has control applied to it in such a way that two switches are closed simultaneously, i.e. two associated antenna elements 10, 12, 14, 16 are supplied simultaneously with the same signal. The transmitted signals then become superimposed into one signal whose wave pattern has approximately the shape it would if it proceeded from a point centered between the relevant antenna elements.

If antenna elements 10 and 12 are powered together, for example, an additional component $\exp(2\pi i \cdot (d_2/2\lambda) \cdot \sin(\theta))$, corresponding to an additional antenna element in the position $d_2/2$ is obtained in the control vector for the transmitting array. This results in four additional components in the vector of the virtual array, corresponding to virtual elements at the positions $d_2/2$, $d_2/2+d_2$, $d_2/2+d_3$, and $d_2/2+d_4$. For the true azimuth angle of the object, the antenna diagrams that belong to these virtual elements must also furnish the complex amplitudes, measured for the peak of the object, of the intermediate-frequency signals $Z_1$ to $Z_4$. In this way the additional elements contribute to avoiding any ambiguities.

Figure 2:
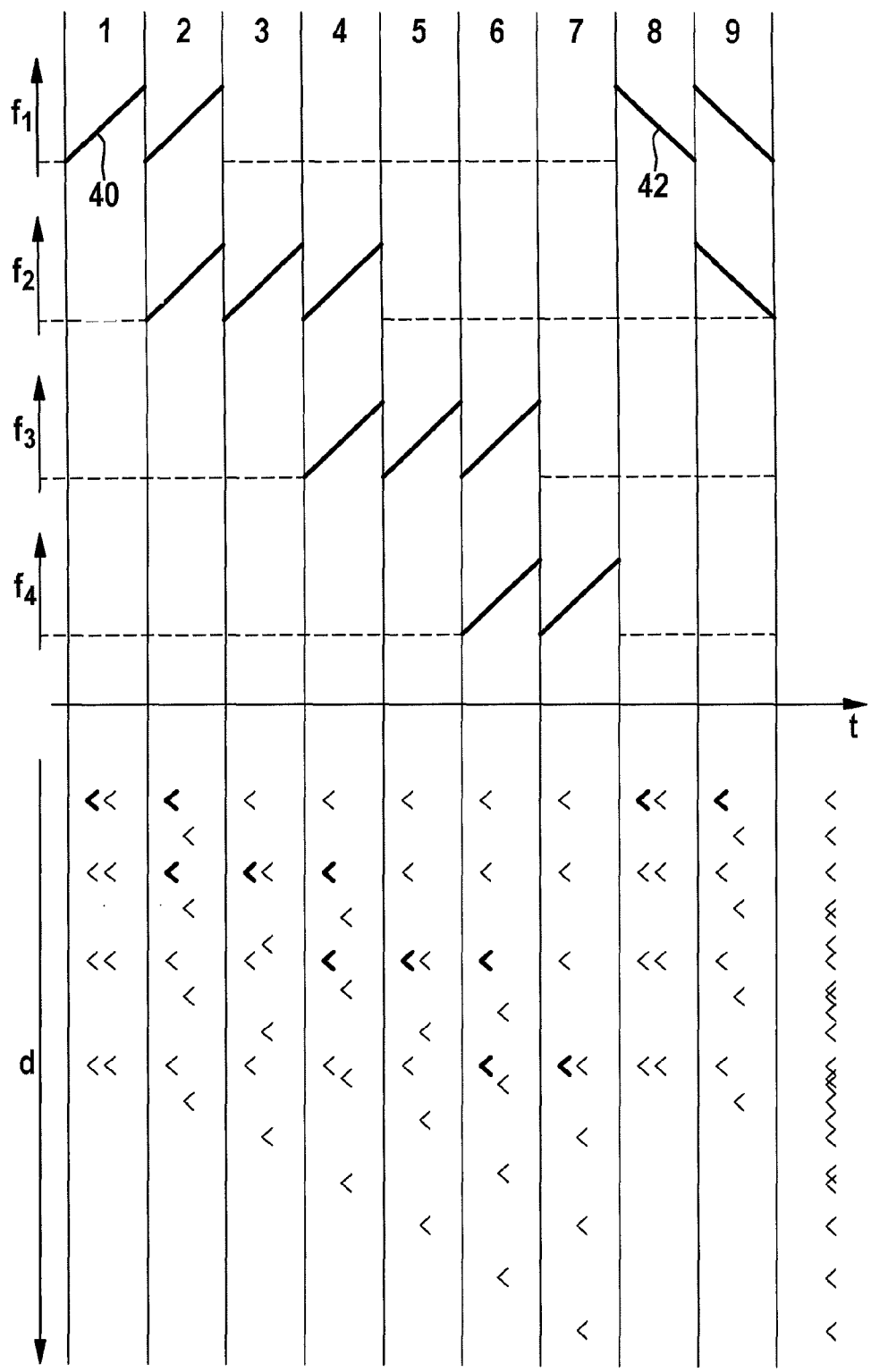
FIG. 2 is a diagram to explain the manner of operation of the radar sensor of FIG. 1.

A possible mode of operation of the radar sensor shown in FIG. 1 is depicted in diagram form in FIG. 2. In the top part of the diagram the frequencies $f_1$ to $f_4$ of the signals transmitted by antenna elements 10 to 16 are plotted as a function of time t. Dashed lines mark time periods in which the relevant antenna element is disconnected from oscillator 24 and is therefore not transmitting a signal. In a first period 1 only antenna element 10 is active, and it transmits firstly a signal (frequency $f_1$) that is made up of a rising frequency ramp 40. The bottom part of the diagram symbolically depicts, for each period, the positions d of the real antenna elements 10 to 16 (arrows in the left column) as well as the positions of the respective virtual antenna elements (thinner arrows in the right column) In the first period, the virtual positions coincide with the real positions.

In a subsequent period 2, frequency ramps 40 are repeated at antenna element 10, but the same signal is now additionally emitted as well via antenna element 12 (frequency $f_2$). The symbols for the active antenna elements are shown in boldface in the bottom part of the diagram. The symbols for the virtual antenna elements are displaced here by an amount $d_2/2$.

In period 3 only second antenna element 12 is then active. In the subsequent period 4 the second and the third antenna element 10, 14 are together supplied with the signal of oscillator 24, thereby once again producing virtual positions that are located between the real positions of the antenna elements.

In period 5 only third antenna element 14 is active, in the subsequent period 6 the third and the fourth antenna element 14, 16 are supplied together, and in period 7 only fourth antenna element 16 is active. This pattern is then repeated, except now with falling frequency ramps 42. Apart from this difference, periods 8 and 9 in FIG. 2 correspond to periods 1 and 2, and are followed by periods 10 to 14 (not shown), which correspond to periods 3 to 7.

Seven further periods can follow in which the signal is again modulated with rising frequency ramps that, however, have a different slope than frequency ramps 40 in periods 1 to 7, and lastly come seven further periods having falling frequency ramps whose slope is different from that of frequency ramps 42. This sequence of (in this example) 28 periods is then cyclically repeated.

All the virtual positions of the antenna elements obtained in this manner are depicted together in the rightmost column of the bottom part of the diagram in FIG. 2. It is evident that the virtual array is filled out to a large extent with additional virtual elements, thereby producing not only a high resolution capability (corresponding to the large aperture) but also a high degree of unambiguity (because of the density of the virtual elements within the array).

If antenna elements 10 to 16 were disposed at uniform distances, the positions of some of the virtual antenna elements would coincide. In period 3, for example, the positions of the second and the third virtual antenna element would then be identical to the positions of antenna elements 12 and 14. In the embodiment shown, however, this is avoided by the fact that the distances between the antenna elements are not equal: $d_4-d_3>d_3-d_2>d_2$.

Figure 3:
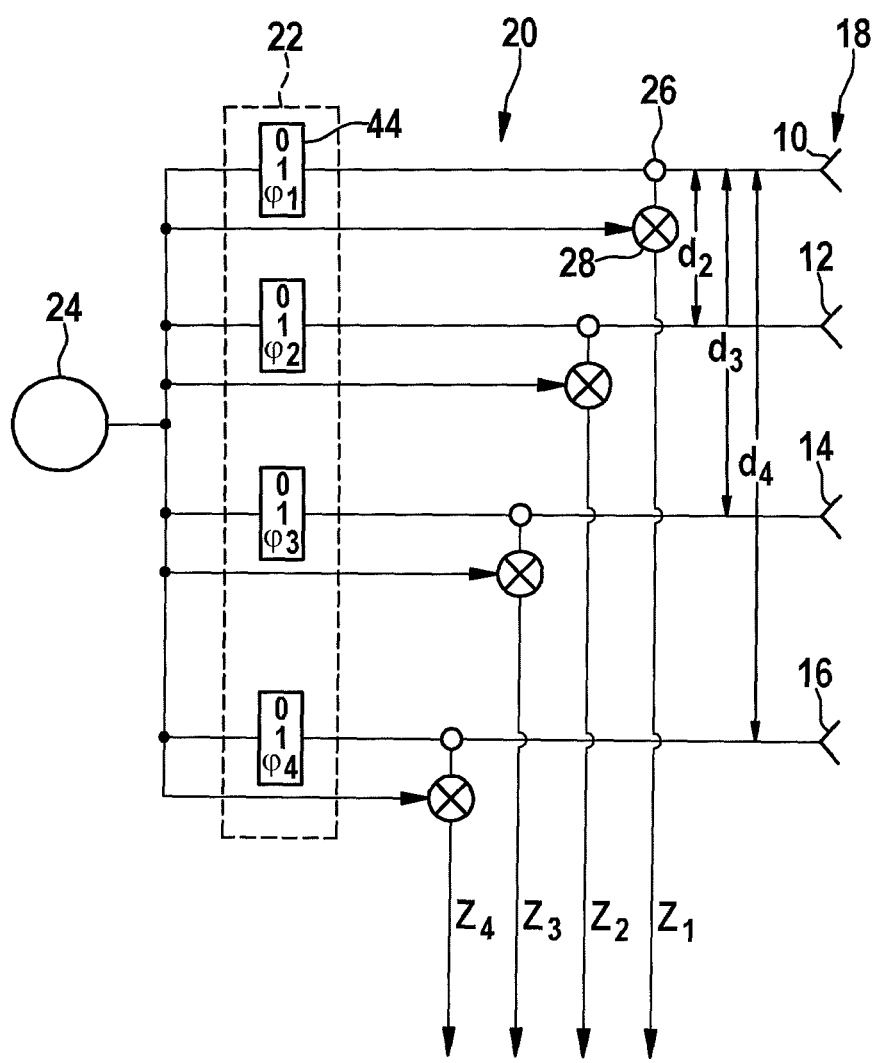
FIG. 3 is a block diagram of a radar sensor in accordance with another exemplifying embodiment of the invention.

FIG. 3 illustrates a possible refinement of the invention in which switching network 22 contains MMIC circuits 44 that not only allow the signal of oscillator 24 to be either conveyed to the relevant antenna element (state "1") or blocked (state "0") but also exhibit at least one state ($\phi1$, $\phi2$, $\phi3$, $\phi4$) in which the signal of the oscillator is conveyed to the relevant antenna element 10, 12, 14, or 16 with a specific phase shift $\phi1$, $\phi2$, $\phi3$, or $\phi4$.

In addition to the state which corresponds to period 2 illustrated in FIG. 2 and in which the two antenna elements 10, 12 are supplied with the same oscillator signal, a state is therefore also possible, for example, in which the signal of oscillator 24 is conveyed to antenna element 10 without modification, but to antenna element 12 with a phase shift $\phi2$. The signals emitted from these two antenna elements then become superimposed into one signal whose principal radiation direction deviates from the azimuth angle θ=0°. Depending on the phase angle $\phi1$ to $\phi4$ that is selected, beam shaping is thus possible in those respective periods in which at least two antenna elements are simultaneously active. This allows a further considerable variation and expansion of the "field of view" of the radar sensor in azimuth.

It is understood that the exemplifying embodiments described here can be modified in many ways. For example, instead of four antenna elements the radar sensor can also have a different number of antenna elements. In addition to a monostatic design, a bistatic design is also possible, in which at least one antenna element serves only for transmission and at least one other antenna element only for reception.

An activity pattern different from the one shown in FIG. 2 can also be used in order to apply control to the transmitting antenna elements. For example, it is possible to activate three or more antenna elements simultaneously in order to generate additional phase centers and thus additional virtual antenna elements. The number and sequence of the different activation states of the antenna elements can also deviate from the pattern shown in FIG. 2. In particular, the periods in which at least two antenna elements are active simultaneously can also be inserted only "as needed," when signal evaluation indicates that ambiguities are occurring.

What is claimed is:

1. An angularly resolving radar sensor, comprising:
   multiple antenna elements that, in a direction in which the radar sensor is angularly resolving, are disposed in different positions forming an antenna array; and
   a control and evaluation device having an operating mode in which several of the antenna elements transmit signals that are respectively received by several of the antenna elements, wherein the control and evaluation device is configured to operate the antenna array as an extended antenna array including one or more virtual antennas, the operating comprising:
   supplying a first signal to a first antenna element of the antenna array;
   simultaneously supplying a second signal to the first antenna element and a third signal of the same frequency as the second signal to a second antenna element of the array, which creates a virtual antenna having a phase center located between the first antenna element and the second antenna element; and
   supplying a fourth signal to the second antenna element.

2. The radar sensor as recited in claim 1, wherein the radar sensor has a monostatic design.

3. The radar sensor as recited in claim 1, wherein distances between pairs of adjacent transmitting antenna elements are different from one another.

4. The radar sensor as recited in claim 1, wherein the control and evaluation device supplies the multiple antenna elements simultaneously with signals that are identical in frequency and identical in phase.

5. The radar sensor as recited in claim 1, wherein the control and evaluation device delivers the identical-frequency signals to the several antenna elements with different phase positions in order thereby to achieve beam shaping.

6. The radar sensor as recited in claim 1, wherein each of the multiple antenna element is connected to a signal source via a monolithic microwave integrated circuit (MMIC), and the control and evaluation device is configured to phase shift, via one or more MMICs, one or both of the second and third signals to modify the phase center of the virtual antenna.

7. A method of operating a radar sensor having a plurality of antenna elements forming an antenna array, the method comprising:
   supplying a first signal to a first antenna element of the antenna array;
   simultaneously supplying a second signal to the first antenna element and a third signal of the same frequency as the second signal to a second antenna element of the array, which creates a virtual antenna having a phase center located between the first antenna element and the second antenna element; and
   supplying a fourth signal to the second antenna element.

8. The method of claim 7, wherein the second and third signals have the same phase.

9. The method of claim 8, wherein each of plurality of antenna elements is connected to a signal source via a monolithic microwave integrated circuit (MMIC) configured to modify a signal transmitted from the signal source to one or more of the plurality of antenna elements with a phase shift.

10. The method of claim 7, further comprising phase shifting one or both of the second and third signals to modify the phase center of the virtual antenna.

* * * * *